March 2, 1926.
F. E. SUTTON
STORAGE BATTERY
Filed May 31, 1922
1,575,393
2 Sheets-Sheet 1
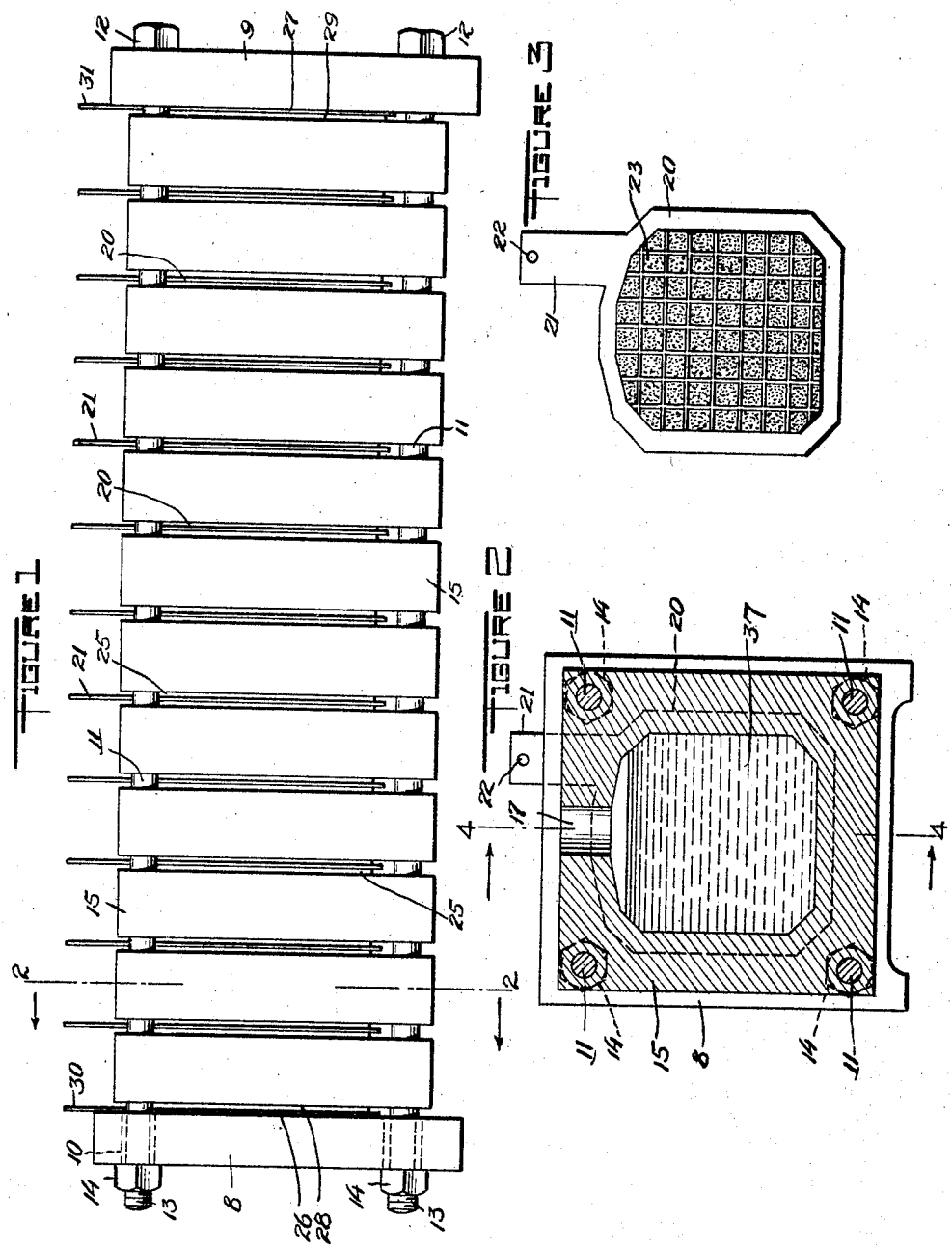

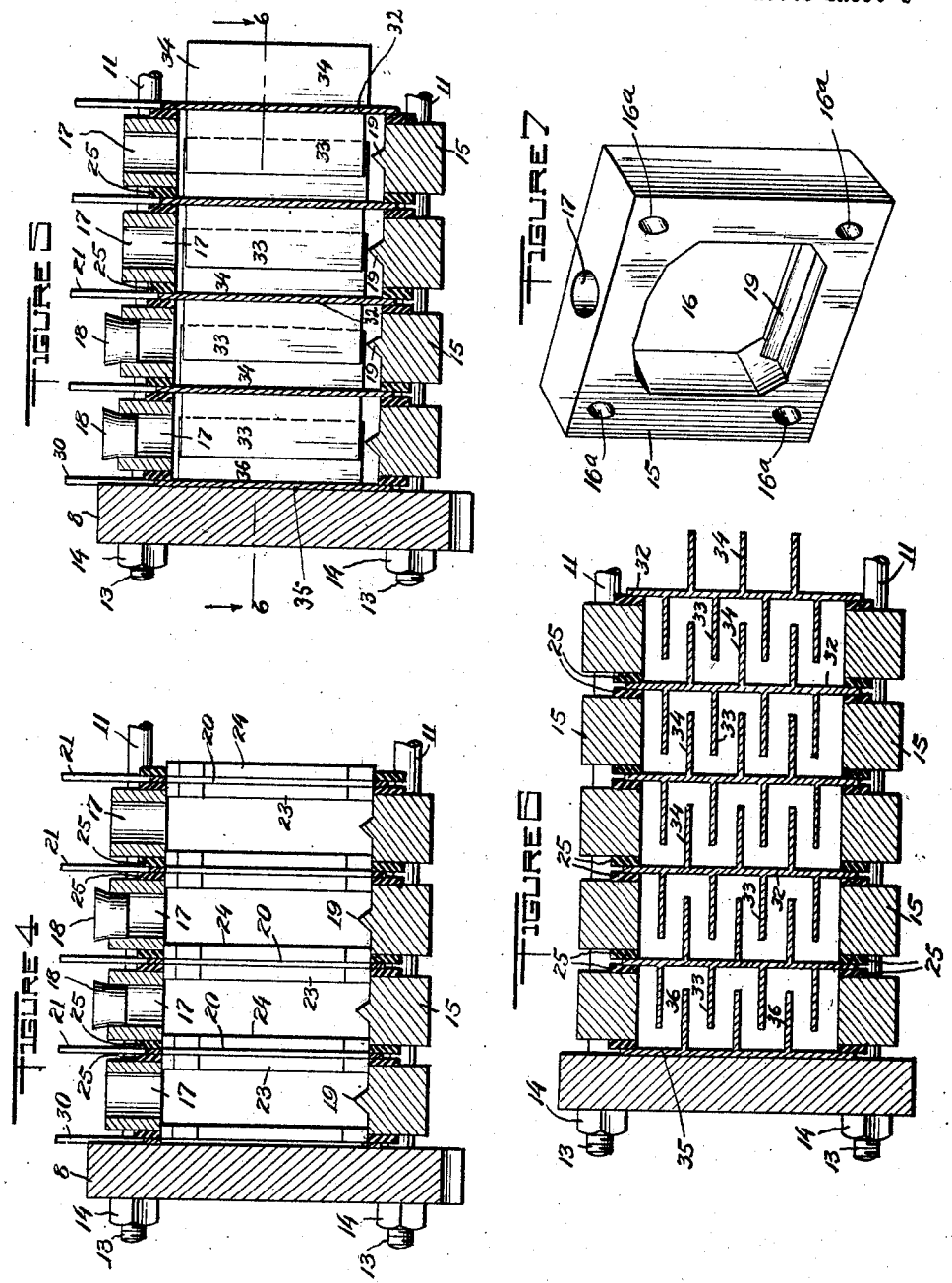

Patented Mar. 2, 1926.

1,575,393

UNITED STATES PATENT OFFICE.

FREDERIC ERNEST SUTTON, OF NEWARK, NEW JERSEY.

STORAGE BATTERY.

Application filed May 31, 1922. Serial No. 564,808.

*To all whom it may concern:*

Be it known that I, FREDERIC ERNEST SUTTON, a citizen of the United States, residing in Newark, in the county of Essex and State of New Jersey, have invented certain new and useful Improvements in Storage Batteries, of which the following is a full, clear, and concise description.

My invention relates to storage batteries, my more particular purpose being to produce a storage battery built up of cellular units, any convenient number of which may be grouped together, taken apart and regrouped as desired, each cellular unit being relatively simple in construction and made up of a minimum number of parts.

My invention contemplates a storage battery in which the separate parts of various kinds are rendered readily accessible, for purposes of examination, repair and replacement.

In addition my invention comprehends a storage battery in which the various parts are of simple construction, and in which they admit of relatively cheap manufacture.

My invention also embraces a storage battery in which the separate cellular units are held together tightly and effectively by means of bolts or the like—or in other words by simply clamping the units together.

My invention further contemplates various improvements in storage battery construction, for the purpose of increasing the efficiency of the battery, considered part by part or as a whole.

Reference is made to the accompanying drawing forming a part of this specification, and in which like reference characters indicate like parts throughout all of the figures.

Figure 1 is a side elevation showing one form of my improved storage battery.

Figure 2 is a section on the line 2—2 of Figure 1, looking in the direction indicated by the arrows.

Figure 3 is an elevation of one of the battery plates, carrying active materials.

Figure 4 is a section on the line 4—4 of Figure 2, looking in the direction indicated by the arrows, but showing the cellular units as empty.

Figure 5 is a section somewhat similar to Figure 4, but showing a different form of battery plate than the one appearing in Figure 1 to 4 inclusive.

Figure 6 is a section on the line 6—6 of Figure 5, looking in the direction indicated by the arrows.

Figure 7 is a perspective showing one of the hollow spacing units, used partly for spacing the plates apart and partly for containing the battery liquid.

A pair of end plates 8 and 9 each having a form which may be understood from Figures 1 and 2, are made of insulating material such as bakelite, fiber, hard rubber, porcelain, bisque, or any of the many well known compositions heretofore employed as a material suitable for battery cell construction. Each end plate 8 and 9 is provided with holes 10, four in number, one of which may be seen in Figure 1. Threaded through these holes are four tension bolts 11, each provided with a head 12 and with a threaded end portion 13. Each bolt is further provided with a nut 14, revolubly fitted upon the threaded portion.

Intermediate the end plates 8 and 9, are a number of spacing blocks 15, each provided with an aperture 16 and thus rendered hollow. Each spacing block is provided with four bolt holes 16a, and with a hole 17, used in filling the block with a battery liquid. I provide a number of stoppers 18, equal to the number of spacing blocks 15, for the purpose of closing the holes 17. The spacing blocks are made of insulating material, such as any of those above mentioned with reference to the end plates 8 and 9.

Each spacing block 15 is further provided with a rib 19, integral with it and extending in the general direction of the width of the block, as shown in Figure 7. The purpose of this rib is to prevent short-circuiting in consequence of sediment accumulating in the battery.

I provide a number of battery plates 20, each having a form which may be understood from Figures 1, 3 and 4. Each battery plate 20 is made of lead or any other material appropriate for a storage battery plate and is provided with an upwardly projecting stem 21, integral with it, the stem having a small hole 22 to facilitate the connection of a wire with the plate, by soldering or otherwise. Each battery plate 20 carries a pair of oppositely disposed faces 23 and 24, each containing active material; one of these faces, say the face 23, being suitable for use as a cathode and the other face say 24, being adapted for service as anode.

I provide also a number of rubber gaskets 25, each of proper size and form to fit peripherally around one of the faces 23 and 24. These gaskets are arranged in pairs, one pair being allotted to each plate 20. When each plate, with its pair of gaskets 25, is placed in between a pair of consecutive spacing blocks 15, and the bolts tightened as hereinafter described, the gaskets are compressed, and a fluid-tight joint is thus formed between the spacing blocks.

At the ends of the battery I employ two battery plates 26 and 27, each similar to the plate 20 shown in Figure 3, except that it is provided with only a single face 28 or 29, containing active material. Each of the end plates 26 and 27 is provided with a projecting stem 30 or 31, similar to the projecting stem 21 above described, and used as a battery terminal.

In the form shown in Figures 5 and 6, the battery plates are shown at 32, and are each provided with a number of projecting flanges 33 and 34, as shown more particularly in Figures 5 and 6. At each end of the battery is an end plate 35, provided with projecting flanges 36. The purpose of the flanges 33, 34 and 36 is to increase the extent of surface available in the battery plates, and to reduce the internal resistance of the battery.

Except as otherwise described, the construction and action of the form of my device shown in Figures 5 and 6 is like that of the form shown in Figures 1, 2 and 4.

My battery in its electrical characteristics operates upon the general principles controlling the action of most other storage batteries. Its action therefore may be readily understood from the foregoing description.

The battery as a whole contains essentially as many cellular units as there are spacing blocks 15. Since each of the plates is provided with an anode face and a cathode face, only one of these plates is needed to each of the spacing blocks, except at the ends of the battery. Broadly speaking, therefore, each of the cellular units of the battery may be regarded as made up principally of two parts, namely, a spacing block and a battery plate. Thus the construction is exceedingly simple, and the battery as a whole is built up of a relatively small number of separate parts. Owing to the small size and light weight of the respective cellular units, the battery is very compact and light. Yet the voltage is the same as in any other storage battery having an equal number of cells. The amperage is very high, and can be increased by using the construction of plates shown in Figures 5 and 6.

The battery liquid contained in one of the spacing blocks is shown at 37, in Figure 2. It is not necessary to take the cellular units apart in order to empty out the battery liquid or to refill the spacing blocks. They may be emptied and refilled either singly or in groups as desired. If only one of the spacing blocks is to be emptied and refilled, only one of the stoppers 18 is removed, the others all remaining tightly in position. This done the battery may be inverted and the liquid poured out of the single spacing block from which the stopper was removed.

My battery is well adapted for radio work, and admits of a number of uses in broadcasting. It is well adapted for service as a B battery for use in connection with an audion or other vacuum tube receiver. The battery may be employed to advantage in aeroplanes, and generally speaking in all relations where a powerful battery, light in weight, is required.

By making the rods 11 long or short, any reasonable number of cellular units may be employed in the battery. Furthermore, by grouping together a considerable number of cells any desired number of cellular units may be employed, to the exclusion of the other cellular units of the same group. This is done by simply tapping off the current by aid of the projecting stems 21, 30 and 31.

It will be noted that the roof of the opening or aperture 16 in each of the frames 15 (see Fig. 2) slopes upwardly from each side of the frame towards the vent or filling opening 17. This feature is especially important if the cell or cells are so full that the electrolyte extends up to or into the opening or openings 17. In this case any gas or gases, generated in the cell or cells, passes upwardly and out of the aperture 17 without causing any discharge of the electrolyte. If the roof of the aperture 16 were square or horizontal, and the electrolytes were up to or in the opening 15, there would be pockets of gas formed and trapped in the corners which would eventually blow out a plug of electrolyte through the opening 17.

I do not limit myself to the precise mechanism shown, as variations may be made therein without departing from my invention, the scope of which is commensurate with my claims.

Having thus described my invention, what I claim as new and desire to secure by Letters Patent is as follows:

1. A secondary cell comprising in combination, a frame having a vent and filling opening at its upper portion, a cathode plate extending across one face of said frame, and an anode plate extending across the opposite side of said face and cooperating with said frame and cathode plate to form the electrolyte container, each of said plates being provided with a plurality of substantially vertical ribs which extend toward the other plate and between and alternating with the ribs of the other plate.

2. A secondary battery comprising in combination, a series of frames, a plurality of battery plates interposed between said frames and cooperating therewith to form a plurality of electrolyte-containing cells, each of said plates being provided on its opposite faces with a plurality of substantially vertical ribs which extend between and alternate with the ribs of the adjacent plates, one face of each of said plates constituting a cathode plate and the other side an anode plate, and means for clamping said frames and plates together.

3. In a storage battery in combination, a positive and a negative plate having substantially plane surfaces and vertical ribs extending laterally therefrom, the ribs of one plate extending between and intermediate of the ribs of the other plate.

4. In a storage battery in combination, a positive and a negative plate having vertical ribs so placed that multiple conductive paths extending at substantially right angles are provided.

5. In a storage battery, in combination, positive and negative plates having substantially plane surfaces of active material and vertical ribs extending therefrom, the ribs of one plate extending between and intermediate of the ribs of the other plate.

FREDERIC ERNEST SUTTON.